United States Patent
Notsu et al.

(10) Patent No.: US 10,864,761 B2
(45) Date of Patent: Dec. 15, 2020

(54) GLASS PLATE WITH AN IDENTIFICATION MARK, AND PROCESS FOR FORMING AN IDENTIFICATION MARK ON A GLASS PLATE

(71) Applicant: AGC Inc., Chiyoda-ku (JP)

(72) Inventors: Keiji Notsu, Chiyoda-ku (JP); Yoshiaki Ohba, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/274,278

(22) Filed: Feb. 13, 2019

(65) Prior Publication Data

US 2019/0263165 A1    Aug. 29, 2019

(30) Foreign Application Priority Data

Feb. 27, 2018    (JP) .................................. 2018-033409

(51) Int. Cl.
| | |
|---|---|
| *B41M 5/24* | (2006.01) |
| *B41M 5/26* | (2006.01) |
| *B24B 9/10* | (2006.01) |
| *C03C 19/00* | (2006.01) |
| *B60J 1/00* | (2006.01) |

(52) U.S. Cl.
CPC ............ *B41M 5/262* (2013.01); *B24B 9/10* (2013.01); *B60J 1/00* (2013.01); *C03C 19/00* (2013.01)

(58) Field of Classification Search
CPC ........... B41M 5/262; B41M 5/24; B24B 9/10; C03C 19/00; C03C 2218/328; C03C 17/22; C03C 23/0025; B60J 1/00; B23K 26/36; B23K 26/14; B23K 26/142
See application file for complete search history.

(56) References Cited

U.S. PATENT DOCUMENTS

| | | | |
|---|---|---|---|
| 2003/0044582 A1* | 3/2003 | Sakoske | ............... B41M 7/0054 428/195.1 |
| 2006/0029519 A1* | 2/2006 | Nakaya | .................. G01N 1/312 422/63 |
| 2010/0110541 A1* | 5/2010 | Angros | .................. G02B 21/34 359/397 |

FOREIGN PATENT DOCUMENTS

| | | |
|---|---|---|
| JP | 2002-46464 | 2/2002 |
| JP | 2004-43212 | 2/2004 |
| JP | 2015-500749 | 1/2015 |
| JP | 2015-74581 | 4/2015 |
| JP | 5959663 | 8/2016 |
| JP | 6067529 | 1/2017 |

* cited by examiner

*Primary Examiner* — Scott A Richmond
(74) *Attorney, Agent, or Firm* — Oblon, McClelland, Maier & Neustadt, L.L.P.

(57) ABSTRACT

A glass plate with an identification mark and a process for forming an identification mark on a glass plate are configured such that the identification mark includes a plurality of first openings, each of the first openings further includes a plurality of second openings, each of which has a smaller area than each of the first openings, and each of the second openings is formed in a substantially circular shape having a radius of at least 0.05 mm and at most 0.3 mm.

21 Claims, 5 Drawing Sheets

GLASS PLATE WITH AN IDENTIFICATION MARK, AND PROCESS FOR FORMING AN IDENTIFICATION MARK ON A GLASS PLATE

TECHNICAL FIELD

The present invention relates to a glass plate with an identification mark, and a process for forming an identification mark on a glass plate.

BACKGROUND ART

It has been known that an identification mark, such as a maker code, a product number, a certification mark, a production date and a JIS mark, is formed on a glass plate, which is to be applied to an opening of an automobile.

For example, Patent Document 1 discloses that a shot blasting method is utilized to form a rough surface part on a glass plate to form an identification mark on the glass plate. Further, Patent Document 2 discloses that a plastic pane with a dark resin frame disposed thereon is irradiated with a laser beam from a direction opposed to a surface of the plastic pane with the resin frame disposed thereon such that a brightened part is provided in a boundary part between the plastic pane and the resin frame.

PRIOR ART DOCUMENTS

Patent Documents

Patent Document 1: Japanese Patent No. 6067529
Patent Document 2: Japanese Patent No. 5959663

DISCLOSURE OF INVENTION

Technical Problem

The process disclosed Patent Document 1 could lead to a decrease in the strength of the glass plate because the surface of the glass plate is roughened. On the other hand, the process disclosed by Patent Document 2 has a problem that it is difficult to ensure correct reading for a long period of time because a plastic (resin) is likely to be damaged and to deteriorate over time.

It is an object to the present invention to provide measures to solve the problem.

Solution to Problem

In order to solve the problems, according to one aspect of the present invention, there is provided a glass plate with an identification mark including:
including a glass plate, a first light-shielding layer disposed on the glass plate along a peripheral edge area of at least one of the principal surfaces of the glass plate, and an identification mark formed in a region where the first light-shielding layer is disposed,
wherein the identification mark includes a plurality of first openings, and each of the first openings further includes a plurality of second openings, each of which has a smaller area than each of the first openings, and wherein the second openings are formed in a substantially circular shape having a radius of at least 0.05 mm and at most 0.3 mm.

In order to solve the problems, according to another aspect of the present invention, there is provided a process for forming an identification mark on a glass plate, wherein the identification mark is formed by applying a laser beam to a light-shielding layer disposed on a glass plate along a peripheral edge area of at least one of the principal surfaces of the glass plate, including:
a step of applying the laser beam toward the light-shielding layer of the glass plate from a laser beam source, the laser beam having an output power of at least 2 W and at most 25 W, and forming a plurality of second openings in a substantially circular shape having a radius of at least 0.05 mm and at most 0.3 mm such that the second openings in the light-shielding layer are formed so as to reach the surface of the glass plate;
a step of forming each of a plurality of first openings by moving an irradiation position of the laser beam while forming the second openings; and
a step of forming the first openings to form the identification mark.

Advantageous Effects of Invention

In accordance with the present invention, it is possible to provide a glass plate with an identification mark and a process for forming an identification mark on a glass plate, which are capable of preventing a decrease in the strength of the glass plate and ensuring correct reading for a long period of time.

DESCRIPTION OF EMBODIMENTS

Now, embodiments of the present invention will be illustrated with reference to the accompanying drawings. The members, elements and parts referred to in the embodiments described below will be all described as examples, and the spirit or scope of the present invention should not be construed to be limited to such members, elements and parts.

First Embodiment

Figure 1:
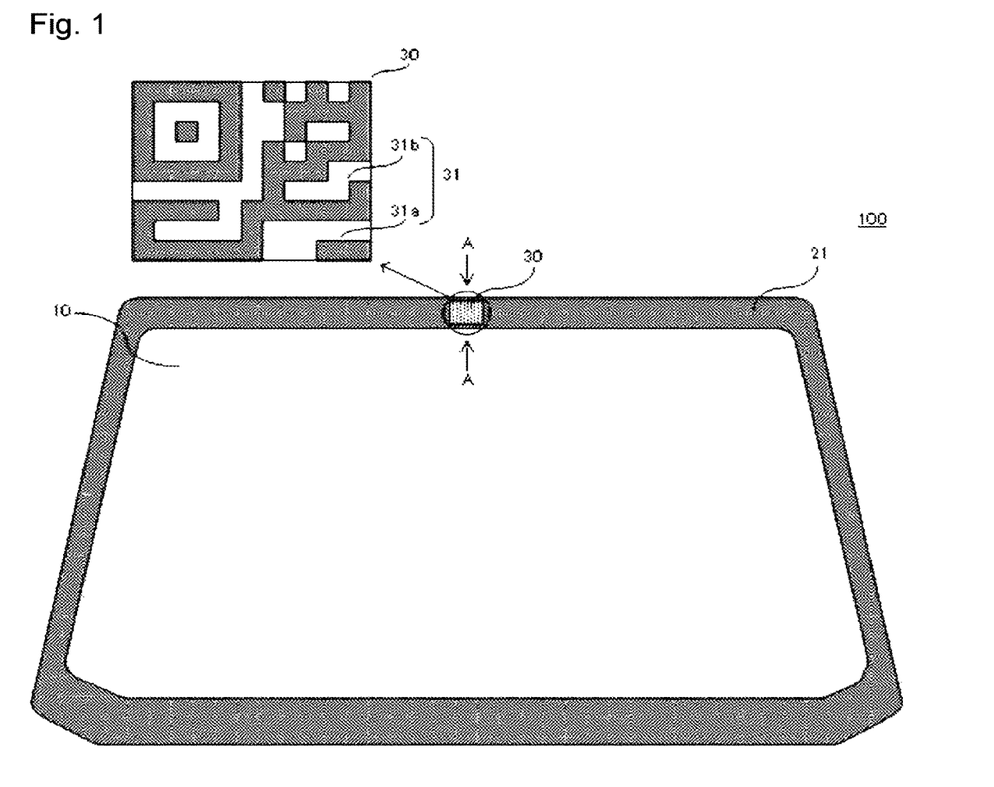
FIG. 1 is a front view illustrating the glass plate with an identification mark according to a first embodiment of the present invention.

As shown in FIG. 1, the glass plate with an identification mark 100 according to a first embodiment of the present invention includes a glass plate 10, a first light-shielding layer 21 disposed on the glass plate along a peripheral edge area of at least one of the principal surfaces of the glass plate, and an identification mark 30 formed in a region where the light-shielding layer 21 is disposed.

The glass plate 10 may be made of, for example, soda lime glass, borosilicate glass, alkali-free glass or quartz glass with no specific limitation. Among them, soda lime glass is particularly preferred. The glass plate 10 may be either non-tempered glass or tempered glass. Non-tempered glass is one that is obtained by forming molten glass in a plate-like shape and annealing the glass. Tempered glass is one wherein a compressive stress layer is formed in a surface of non-tempered glass. Tempered glass may be either physically tempered glass (e.g., glass tempered by air-quenching) or chemically tempered glass. In the case of physically tempered glass, a glass plate that has been uniformly heated may start being quenched at a temperature close to the softening point of the glass plate to produce compressive stresses in a glass surface by a temperature difference between the glass surface and the inside of the glass, strengthening the glass surface. In the case of chemically tempered glass, an ion exchange method or the like may be utilized to produce compressive stresses in a glass surface, strengthening the glass surface. Although the glass plate 10 is preferred to be transparent, it is acceptable to use a glass plate that has been colored to a degree to which the transparency is not largely lost. Although there is no particular limitation to the thickness of the glass plate 10, the glass plate is advantageously applicable to a windowpane for an opening of an automobile as long as the glass plate has a thickness of at least 0.5 mm and at most 5.0 mm.

The glass plate 10 includes the first light-shielding layer (dark ceramic layer) 21, which is disposed in a strip shape thereon along the peripheral edge area of at least one of the principal surfaces thereof and is dark and opaque, such as black. The first light-shielding layer 21 has a function of protecting e.g., an urethane sealant for bonding and holding the glass plate 10 to a vehicle body from deterioration caused by an ultraviolet ray. The first light-shielding layer 21 may be disposed by applying ceramic paste on the principal surface of the glass plate 10, followed by baking the ceramic paste. The first light-shielding layer 21 has a thickness of preferably at least 3 μm and at most 15 μm. Although there is no particular limitation to the width of the first light-shielding layer as long as the first light-shielding layer has a width enough to form the identification mark 30 therein, the width is preferred to be at least 20 mm and at most 300 mm because of allowing the identification mark 30 according to the present invention to be formed in the first light-shielding layer. As described later, the glass plate 10 may have a second light-shieling layer 22 disposed on a principal surface opposed to the principal surface where the first light-shielding layer 21 is disposed.

Further, the glass plate with an identification mark 100 according to the first embodiment of the present invention has the identification mark 30 formed in the region where the first light-shielding layer 21 is disposed. The identification mark 30 is formed by grinding by use of, e.g. a laser beam as described later. Although the identification mark 30 may be utilized for identifying a maker code, a product number, a certification mark, a production date and a JIS mark, the identification mark is preferred to be utilized for applying production information to each glass plate, such as machining conditions, inspection conditions and optical properties of the glass plate 10. In other words, the identification mark 30 to be formed on the glass plate 10 according to the first embodiment of the present invention may represent different kinds of information from glass plate to glass plate. When the identification mark 30 represents different kinds of information from glass plate to glass plate, it is possible to utilize the identification mark for applying production information on each glass plate, such as machining conditions, inspection conditions and optical properties of the glass plate 10, such that the information related to each glass plate can be collated with data stored in a data storage of a company. Further, in a case where the identification mark 30 represents different kinds of information from glass plate to glass plate, even when a trouble occurs in a final product, it becomes easier to trace in which step during production the trouble occurred.

The identification mark 30 may represent a one-dimensional code or a two-dimensional code as long as production information is applicable to the identification mark. The one-dimensional code may be, for example, a known bar code. On the other hand, the two-dimensional code may be, for example, a matrix type two-dimensional code.

Although there is no particular limitation to the dimensions of the identification mark 30 as long as the above-mentioned production information is applicable to the identification mark, the above-mentioned production information is applicable to the identification mark 30 as long as the identification mark has dimensions of (at least 5 mm to at most 20 mm)×(at least 5 mm to at most 50 mm).

The identification mark 30 is configured such that information applied to the identification mark 30 is optically read out by a reader. For this reason, the identification mark 30 is preferred to be a binary representation (black-and-white representation) including a black part and a white part (transparent part). With regard to the black part, the first light-shielding layer 21 plays the black part, being black (dark). On the other hand, with regard to the white part, the white part may be provided by forming an opening (hole) in the first light-shielding layer 21 such that the opening is formed so as to reach a surface of the glass plate 10 as sown in FIG. 2.

As shown in FIG. 1, the identification mark 30 is configured to have a plurality of first openings 31 provided as a plurality of positions 31a and 31b by forming openings in the first light-shielding layer 21 such that the openings are formed so as to reach the surface of the glass plate 10.

Figure 3:
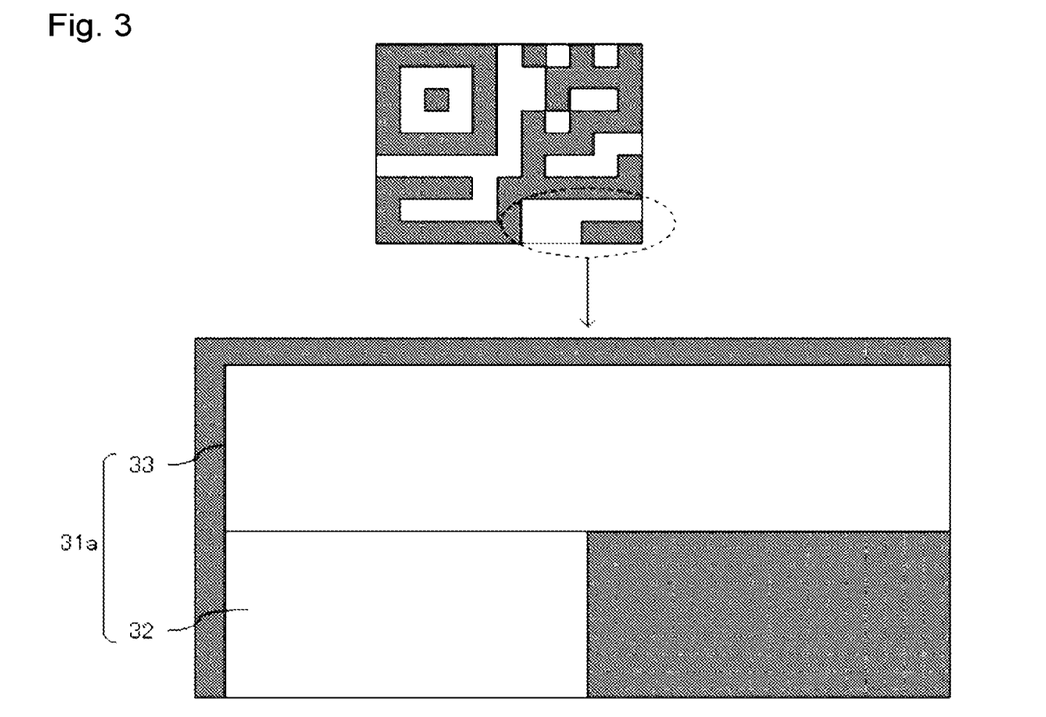
FIG. 3 is a partially enlarged schematic view illustrating the glass plate with an identification mark shown in FIG. 1.
Figure 4:
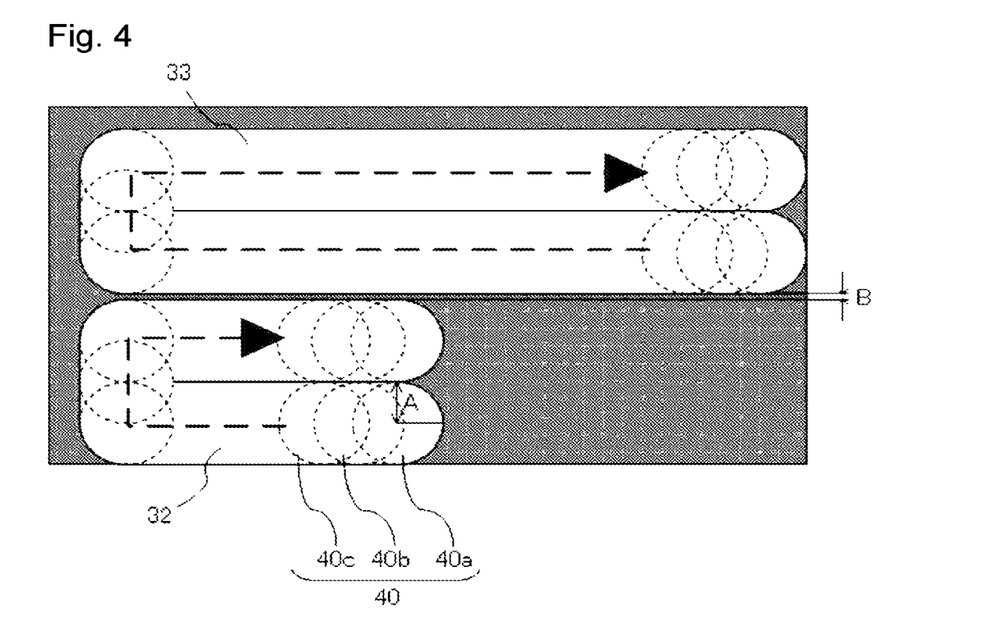
FIG. 4 is a partially enlarged schematic view illustrating the glass plate with an identification mark shown in FIG. 1.

FIG. 4 is a partially enlarged schematic view of the identification mark 30, illustrating a first opening 31a in further detail in the partially enlarged schematic view shown in FIG. 3. As shown in FIG. 4, each first opening 31a may be configured to include a plurality of first sub-openings 32, 33 or include first sub-openings 32, 33 integrally formed each other. The first sub-openings 32 and 33 may have different shapes or different areas in some cases. From this point of view, the first sub-openings 32 and 33 may be provided by forming a plurality of second openings 40 having a smaller area than the first sub-openings 32 and 33.

Explanation will be made about a second opening 40 forming a first sub-opening 32 with reference to FIG. 4.

Each sub-opening 32 may be provided by applying a laser beam to the first light-shielding layer 21 to form an opening, i.e., a second sub-opening 40a in the first light-shielding layer such that the second sub-opening is formed so as to reach the surface of the glass plate 10, followed by moving the irradiation position of the laser beam to form another second sub-opening 40b. Another second sub-opening 40c may be formed in the same manner. Each second opening 40 has substantially the same area as the irradiation area of the laser beam that is applied to the first light-shielding layer 21.

As shown in FIG. 4, the second sub-opening 40a is formed by the first irradiation of the laser beam, and the irradiation position is moved to form the second sub-opening 40b, followed by formation of the second sub-opening 40c. The second sub-openings 40a, 40b and 40c are preferred to be formed so as to be at least partially overlapped between adjacent sub-openings. When the second sub-openings 40a, 40b and 40c are formed so as to be at least partially overlapped between adjacent sub-openings, it is advantageously easier for a reader to optically read the identification mark 30 because the contour of the resulting first sub-opening 32 (the boundary between the first light-shielding layer 21 and the glass plate 10) is more approximated to a straight line.

Although it is shown that each second opening 40 is formed in a substantially circular shape, each second opening 40 may be formed in a substantially ellipsoidal shape. When each second opening 40 is formed in a substantially circular shape, each second opening 40 is preferred to have a radius A of at least 0.05 mm and at most 0.3 mm. When each second opening 40 is formed in a substantially ellipsoidal shape, reference symbol A in FIG. 4 indicates the short axial radius of a second opening. When each second opening has a short axial radius A of at least 0.05 mm, it is possible to reduce the number of moving the irradiation position of the laser beam when a complicated two-dimensional code is formed as the identification mark 30. When each second opening 40 has a short axial radius A of at most 0.3 mm, it is possible to form the identification mark 30 in a minute manner.

Each first opening 31 is preferred to include at least two second openings 40 in order that a reader recognizes the identification mark 30 as a binary code. In order to form the identification mark 30 as a binary code, the identification mark 30 is preferred to include a plurality of first sub-openings 32 and 33 having different areas and/or different shapes. In order that the reader recognizes the identification mark 30 as a binary code, the plurality of first sub-openings 32 and 33 are configured such that the shortest distance B between the first sub-openings 32 and 33 is preferably at most 0.2 mm, more preferably at most 0.05 mm.

When a first opening 31 is formed by forming a plurality of second openings 40 so as to be at least partially overlapped between adjacent second openings, and when such a first opening 31 is formed at a plurality of positions, it is possible to form the identification mark 30 in a more complicated fashion. This arrangement allows the identification mark 30 according to the present invention to be utilized as a two-dimensional code to hold production information including a large volume of data. Although the second openings 40 and the first openings 31 are formed by forming openings in the first light-shielding layer 21 such that the openings reach the surface of the glass plate 10, the glass plate 10 is not damaged since only the first light-shielding layer 21 is ground in a case where a laser is used to grind the first light-shielding layer 21 as described later. Thus, the glass plate with an identification mark 100 according to the present invention can ensure correct reading for a long period of time without a decrease in the strength of the glass plate.

Although it is illustrated in FIG. 1 that the identification mark 30 is formed in substantially a central position of an upper side edge of the glass plate 10 (a roof side of the glass plate in a state that the glass plate is fitted to a vehicle), there is no limitation to the position of the identification mark 30 as long as the identification mark 30 is formed in the region where the first light-shielding layer 21 is disposed. It should be, however, noted that the identification mark is preferred to be formed in the vicinity of an edge of the glass plate 10 from the viewpoint of design appearance.

Figure 2:
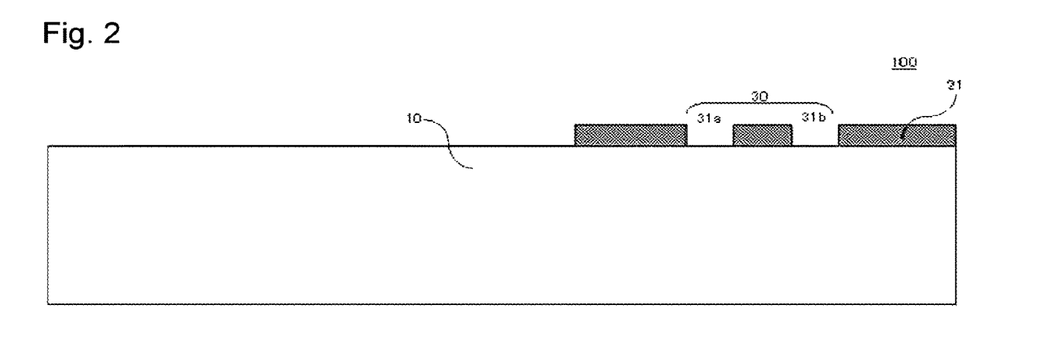
FIG. 2 is a cross-sectional view illustrating the glass plate with an identification mark shown in FIG. 1, taken along line A-A of FIG. 1.

Although it is illustrated in FIG. 2 that the glass plate 10 is a single plate, the glass plate 10 may be configured as laminated glass where another glass plate is disposed, via an interlayer, on a principal surface opposed to the principal surface of the glass plate where the first light-shielding layer 21 is disposed. The interlayer may be an interlayer made of polyvinylbutyral (PVB), and is preferred to be made of an ethylene-vinyl acetate copolymer when water resistance is particularly required. Further, the interlayer may be made of, for example, an acrylic photopolymerizable prepolymer, an acrylic catalytically polymerizable prepolymer, a photopolymerizable prepolymer of acrylic ester and vinyl acetate, or polyvinyl chloride. There is no particular limitation to the glass plate that is to be bonded to the glass plate 10 with the first light-shielding layer 21 disposed thereon. The glass plate that is to be bonded to the glass plate 10 may be the same as or different from the glass plate 10 in terms of composition, shape and thickness. When laminated glass is applied to an automobile opening, the glass plate 10 with the first light-shielding layer 21 disposed thereon is preferred to be positioned on a car-interior side. The glass plate that is to be bonded to the glass plate 10 may also have a light-shielding layer disposed on a principal surface thereof along a peripheral edge area of one of the principal surfaces of the principal surface. In a case where the glass plate that is to be bonded to the glass plate 10 has a light-shielding layer disposed thereon, the principal surface with the light-shielding layer disposed thereon is preferred to be positioned in a car-interior side in a state that the glass plate that is to be bonded to the glass plate 10 is applied to an automobile opening. In a case where the glass plate that is to be bonded to the glass plate 10 has such a light-shielding layer disposed thereon, when the light-shielding layer is disposed in a position to shield the identification mark 30, the laminated glass not only has a function of protecting e.g., an urethane sealant for bonding and holding the laminated glass to a vehicle body from deterioration caused by an ultraviolet ray but also prevents design appearance from deteriorating, which are preferred.

Second Embodiment

Figure 5:
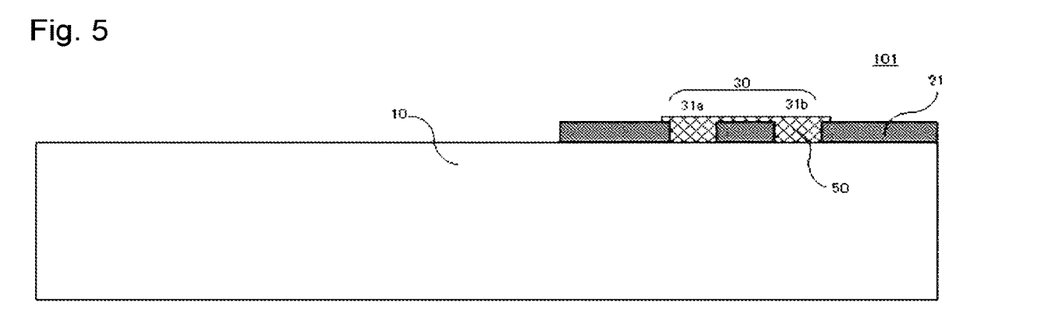
FIG. 5 is a cross-sectional view illustrating the glass plate with an identification mark according to a second embodiment of the present invention, taken along a line corresponding to line A-A of FIG. 1.

FIG. 5 is a cross-sectional view of the glass plate with an identification mark 101 according to a second embodiment of the present invention, taken along a line corresponding to line A-A perpendicular to an outer peripheral edge of the glass plate with an identification mark 100 according to the first embodiment shown in FIG. 1. As shown in FIG. 5, the glass plate with an identification mark 101 according to the second embodiment is different from that according to the first embodiment in that the identification mark 30 is concealed with a dark material 50. The other members, elements and parts are common to the ones of the glass plate with an identification mark 100 according to the first embodiment. For this reason, the other members, elements and parts are designated by the identical reference symbols, and explanation of those will be omitted.

In the glass plate with an identification mark 100 according to the first embodiment, the first openings 31a and 31b are formed by forming openings in the first light-shielding layer 21 such that the openings reach the surface of the glass plate 10. This arrangement partly impairs the function of the first light-shielding layer 21, by which e.g., an urethane sealant for bonding and holding the glass plate 10 to a vehicle body is protected from deterioration caused by an ultraviolet ray. Further, when the identification mark 30 is exposed, design appearance could deteriorate.

Since the glass plate with an identification mark 101 according to the second embodiment has the identification mark 30 shielded by the dark material 50, the glass plate with an identification mark not only has a function of protecting e.g., an urethane sealant for bonding and holding the glass plate 10 to a vehicle body from deterioration caused by an ultraviolet ray but also prevents design appearance from deteriorating, which are preferred. The dark material 50 may be a paint or adhesive containing a dark pigment, or a resin frame disposed on the peripheral edge area of the glass plate 10. It should be noted that the glass plate with an identification mark 101 according to the second embodiment allows the identification mark 30 to be read by removing only the dark material 50 with e.g., a solvent to expose the surface of the glass plate 10 at the first openings 31a and 31b again.

Third Embodiment

Figure 6:
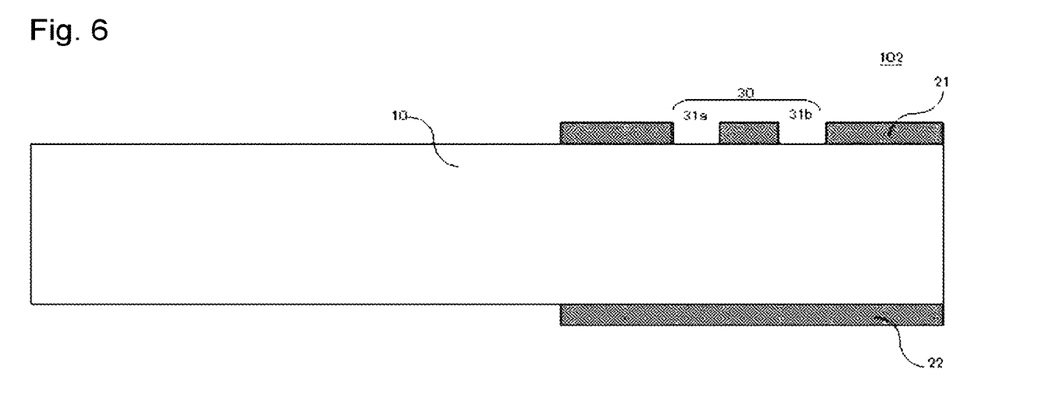
FIG. 6 is a cross-sectional view illustrating the glass plate with an identification mark according to a third embodiment of the present invention, taken along a line corresponding to line A-A of FIG. 1.

FIG. 6 is a cross-sectional view of the glass plate with an identification mark 102 according to a third embodiment of the present invention, taken along a line corresponding to line A-A perpendicular to an outer peripheral edge of the glass plate with an identification mark 100 according to the first embodiment shown in FIG. 1. As shown in FIG. 6, the glass plate with an identification mark 102 according to the third embodiment is different from that according to the first embodiment in that a second light-sealing layer 22 is disposed on a principal surface opposed to the principal surface where the identification mark 30 is formed and that the second light-shielding layer is disposed at a position where the identification mark is invisible when the glass plate is seen from the principal surface where the second light-shielding layer is disposed. The other members, elements and parts are common to the ones of the glass plate with an identification mark 100 according to the first embodiment. For this reason, the other members, elements and parts are designated by the identical reference symbols, and explanation of those will be omitted.

In the glass plate with an identification mark 100 according to the first embodiment, the first openings 31a and 31b are provided by forming openings in the first light-shielding layer 21 such that the openings reach the surface of the glass plate 10. This arrangement partly impairs the function of the first light-shielding layer 21 that protects e.g., an urethane sealant for bonding and holding the glass plate 10 to a vehicle body from deterioration caused by an ultraviolet ray. Further, when the identification mark 30 is exposed, design appearance could deteriorate.

Since the glass plate with an identification mark 102 according to the third embodiment has the second light-sealing layer 22 disposed on the principal surface opposed to the principal surface where the identification mark 30 is formed, the glass plate with an identification mark not only has a function of protecting e.g., an urethane sealant for bonding and holding the glass plate 10 to a vehicle body from deterioration caused by an ultraviolet ray but also prevents design appearance from deteriorating, which are preferred. The second light-sealing layer 22 may be the same as or different from the first light-sealing layer 21 in terms of thickness and material. It is sufficient that the second light-sealing layer 22 have a width enough to shield the identification mark 30.

Process for Forming Identification Mark on Glass Plate

Figure 7:
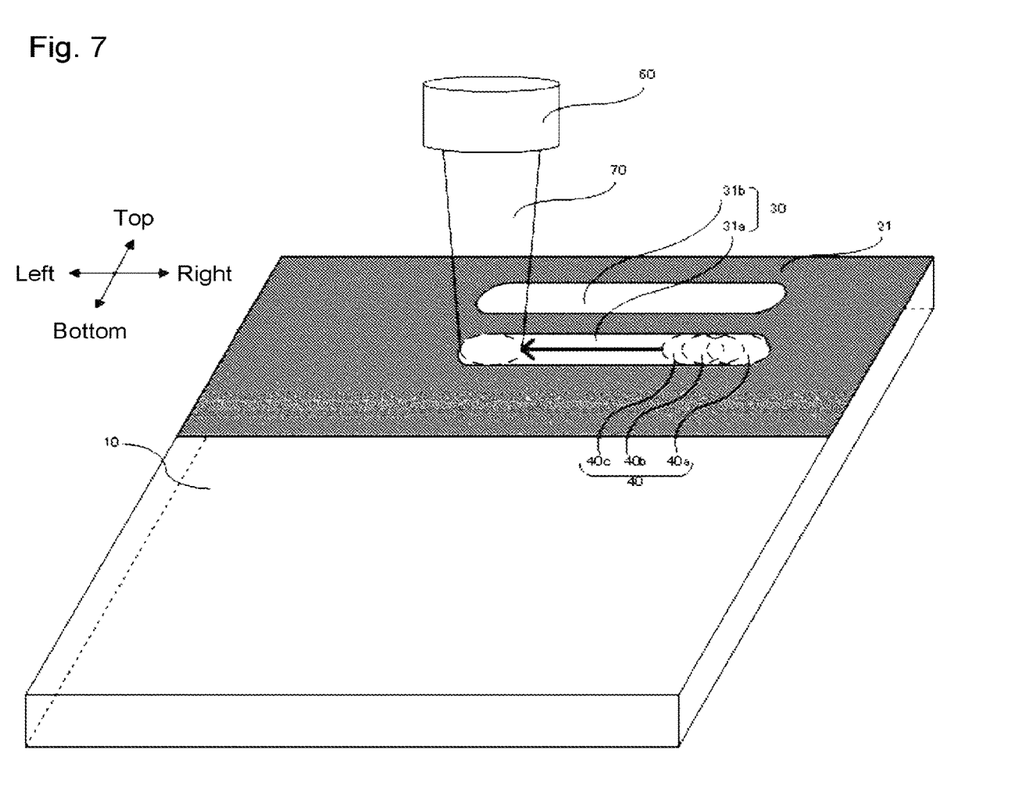
FIG. 7 is a schematic perspective view illustrating a process for forming the identification mark on the glass plate according to the first embodiment of the present invention.

FIG. 7 is a schematic perspective view illustrating a process for forming the identification mark on the glass plate according to the first embodiment of the present invention. As shown in FIG. 7, the process for forming the identification mark on the glass plate according to the first embodiment of the present invention may be performed such that the identification mark 30 is formed by applying a laser beam 70 to the first light-sealing layer 21 which is disposed on the glass plate 21 along the peripheral edge area of at least one of the principal surfaces.

The glass plate 10 may be made of, for example, soda lime glass, borosilicate glass, alkali-free glass or quartz glass with no specific limitation. Among them, soda lime glass is particularly preferred. The glass plate 10 may be either non-tempered glass or tempered glass. Non-tempered glass is one that is obtained by forming molten glass in a plate-like shape and annealing the glass. Tempered glass is one wherein a compressive stress layer is formed in a surface of non-tempered glass. Tempered glass may be either physically tempered glass (e.g., glass tempered by air-quenching) or chemically tempered glass. In the case of physically tempered glass, a glass plate that has been uniformly heated may start being quenched at a temperature close to the softening point of the glass plate to produce compressive stresses in a glass surface by a temperature difference between the glass surface and the inside of the glass, strengthening the glass surface. In the case of chemically tempered glass, an ion exchange method or the like may be utilized to produce compressive stresses in a glass surface, strengthening the glass surface. Although the glass plate 10 is preferred to be transparent, it is acceptable to use a glass plate that has been colored to a degree to which the transparency is not largely lost. Although there is no particular limitation to the thickness of the glass plate 10, the glass plate is advantageously applicable to a windowpane for an opening of an automobile as long as the glass plate has a thickness of at least 0.5 mm and at most 5.0 mm.

The glass plate 10 includes the light-shielding layer (dark ceramic layer) 21, which is disposed in a strip shape thereon along the peripheral edge area of the at least one of the principal surfaces thereof and is dark and opaque, such as black. The light-shielding layer 21 has the function of protecting e.g., a urethane sealant for bonding and holding the glass plate 10 to a vehicle body from deterioration caused by an ultraviolet ray. The light-shielding layer 21 may be disposed by being baked after applying ceramic paste on the principal surface of the glass plate 10. The light-shielding layer 21 has a thickness of preferably at least 3 μm and at most 15 μm. Although there is no particular limitation to the width of the light-shielding layer 21 as long as the first light-shielding layer has a width enough to form the identification mark 30 therein, the width is preferred to be at least 20 mm and at most 300 mm because of allowing the identification mark 30 according to the present invention to be formed in the light-shielding layer. The glass plate 10 may have another light-shieling layer disposed on a principal surface opposed to the principal surface where the light-shielding layer 21 is disposed.

The process for forming an identification mark on a glass plate according to the present invention is performed such that the identification mark 30 is formed by applying a laser beam to the region where the light-shielding layer 21 is disposed. Although the identification mark 30 may be utilized for identifying a maker code, a product number, a certification mark, a production date and a JIS mark, the identification mark is preferred to be utilized for applying production information to each glass plate, such as machining conditions, inspection conditions and optical properties of the glass plate 10. In other words, the identification mark 30 to be formed on the glass plate 10 with an identification mark according to the first embodiment may represent different kinds of information from glass plate to glass plate. When the identification mark 30 represents different kinds of information from glass plate to glass plate, it is possible to utilize the identification mark for applying production information on each glass plate, such as machining conditions, inspection conditions and optical properties of the glass plate 10, such that the information related to each glass plate can be collated with data stored in a data storage of a company. Further, in a case where the identification mark 30 represents different kinds of information from glass plate to glass plate, even when a trouble occurs in a final product, it becomes easier to trace in which step during production the trouble occurred.

The identification mark 30 may represent a one-dimensional code or a two-dimensional code as long as production information is applicable to the identification mark. The one-dimensional code may be, for example, a known bar code. On the other hand, the two-dimensional code may be, for example, a matrix type two-dimensional code.

Although there is no particular limitation to the dimensions of the identification mark 30 as long as the above-mentioned production information is applicable to the identification mark, the above-mentioned production information is applicable to the identification mark 30 as long as the identification mark has dimensions of (at least 5 mm to at most 20 mm)×(at least 5 mm to at most 50 mm).

The identification mark 30 is configured such that information applied to the identification mark 30 is optically read out by a reader. For this reason, the identification mark 30 is preferred to be a binary representation (black-and-white representation) including a black part and a white part (transparent part). With regard to the black part, the light-shielding layer 21 plays the black part, being black (dark). On the other hand, with regard to the white part, the white part may be provided by using a laser beam 70 to form an opening (hole) in the light-shielding layer 21 such that the opening is formed so as to reach a surface of the glass plate 10.

Figure 8:
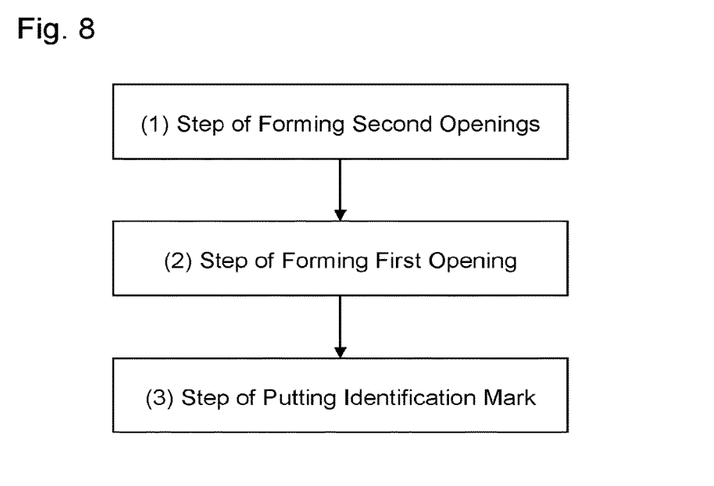
FIG. 8 is a flow chart illustrating the process for forming an identification mark on a glass plate.

The process for forming an identification mark on a glass plate according to the present invention includes, as shown in FIG. 8, (1) a step of applying the laser beam 70 toward the light-shielding layer 21 of the glass plate 10 from a laser beam source 60, the laser beam having an output power of at least 2 W and at most 25 W, and forming the plurality of second openings 40 in a substantially circular shape having a radius of at least 0.05 mm and at most 0.3 mm such that the second openings in the light-shielding layer 21 are formed so as to reach the surface of the glass plate 10; (2) a step of forming each of a plurality of first openings 31 by moving an irradiation position of the laser beam while forming the second openings 40; and (3) a step of forming the first openings 31 to form the identification mark 30.

(1) Step of Forming Second Openings

The glass plate 10 is prepared so as to have the light-sealing layer 21 disposed thereon along the peripheral edge area of at least one of the principal surfaces of the glass plate and is placed on an unshown stage to be positioned thereon. The stage, the method for placing the glass plate on the stage and the method for positioning the glass plate may be a known stage or known method, and there are no limitations thereto.

After the glass plate 10 with the light-sealing layer 21 disposed thereon is positioned, the laser beam 70 is applied toward the light-sealing layer 21 from the laser beam source 60. The laser beam 70 is applied so as to focus on the boundary surface between the light-sealing layer 21 and the glass plate 10 (the surface of the glass plate 10) by use of an unshown objective lens. The objective lens has a focal length of preferably about 190 mm. The laser beam 70 is preferred to be emitted from an excitation solid-state laser, which is preferred to be a $YVO_4$ laser with Nd atoms doped thereinto. The laser beam 70 has an emission wavelength of preferably at least 900 nm and at most 1,200 nm, particularly preferably about 1,064 nm. The laser beam 70 has an output power of preferably at least 2 W and at most 25 W. The laser beam 70 has a continuous oscillation frequency of preferably at least 1 kHz and at most 400 kHz. The use of the laser beam 70 that meets these conditions allows the energy of the laser beam 70 to be absorbed only into the light-sealing layer 21, resulting in avoidance of energy absorption enough to damage the glass plate 10. For this reason, the use of this laser beam 70 is preferred in that only the light-sealing layer 21 is ground while the surface of the glass plate 10 is unlikely to be damaged. The beam passage for the laser beam 70 may include an unshown mirror. By moving the mirror, it is possible to move the irradiation position of the laser beam 70 while the laser beam 70 is applied so as to keep focusing on the boundary surface between the light-sealing layer 21 and the glass plate 10 (the surface of the glass plate 10). The emission wavelength, the output power etc. of the laser beam 70 are not limited to these values as long as the laser beam 70 not only grinds the light-sealing layer 21 up to the surface of the glass plate 10 but also prevents the surface of the glass plate 10 from being damaged.

When the laser beam 70 is applied to the light-sealing layer 21, the laser beam grinds only the light-sealing layer 21 to expose a relevant part of the surface of the glass plate 10 so as to form a second opening. At that time, the second opening 40 has an area substantially equal to the area of the light-sealing layer 21 that is applied by the laser beam. Although it is shown that each second opening 40 is formed in a substantially circular shape, each second opening may be formed in a substantially ellipsoidal shape. When each second opening 40 is formed in a substantially circular shape, each second opening is preferred to have a radius A of at least 0.05 mm and at most 0.3 mm. When each second opening 40 is formed in a substantially ellipsoidal shape, reference symbol A in FIG. 4 indicates the short axial radius of a second opening. When each second opening 40 has a short axial radius A of at least 0.05 mm, it is possible to reduce the number of moving the irradiation position of the laser beam when a complicated two-dimensional code is formed as the identification mark 30. When each second opening 40 has a short axial radius A of at most 0.3 mm, it is possible to form the identification mark 30 in a minute manner.

(2) Step of Forming First Openings

Each first opening 31 is formed such that the laser beam 70 forms a second opening 40 while the irradiation position of the laser beam 70 is formed to form another second opening. In other words, each first opening 31 is made such that the laser beam 70 is applied to form a second opening 40, and that the irradiation position of the laser beam 70 is moved toward a planned region where each first opening 31 is formed. The second sub-openings 40a, 40b and 40c are preferred to be formed so as to be at least partially overlapped between adjacent sub-openings. When the second sub-openings 40a, 40b and 40c are formed so as to be at least partially overlapped between adjacent sub-openings, it is advantageously easier for a reader to optically read the identification mark 30 because the contour of a first sub-opening 32 (the boundary between the light-sealing layer 21 and the glass plate 10) is more approximated to a straight line.

The laser beam 70 has an irradiation position movement speed of preferably at least 200 mm/s and at most 3,000 mm/s, more preferably at least 1,500 mm/s and at most 2,500 mm/s. When the laser beam 70 has an irradiation position movement speed of at least 200 mm/s, it is possible to form the first openings 31 effectively. Further, in a case where the laser beam 70 has an irradiation position movement speed of at least 200 mm/s, even when a first sub-opening 31a is formed, followed by turning off the output of the laser beam 70 for forming another first sub-opening 31b, the light-sealing layer 21 is prevented from being excessively ground by possible attenuation of the laser beam 70, which is preferred. When the laser beam 70 has an irradiation position movement speed of at most 3,000 mm/s, the laser beam 70 is unlikely to overrun a desired irradiation position, resulting in easy optical reading of the identification mark 30 by a reader, which is preferred.

Each first opening 31 is preferred to include at least two second openings 40 in order that a reader recognizes the identification mark 30 as a binary code. In order to form the identification mark 30 as a binary code, the identification mark 30 is preferred to include a plurality of first sub-openings 32 and 33 having different areas and/or different shapes. In order that the reader recognizes the identification mark 30 as a binary code, the plurality of first sub-openings 32 and 33 are configured such that the shortest distance B between the first sub-openings 32 and 33 is preferably at most 0.2 mm, more preferably at most 0.05 mm.

The irradiation position movement direction of the laser beam 70 is not limited to the movement from right to left shown in FIG. 7. The irradiation position movement direction of the laser beam 70 may be moved from left to right, from top to bottom and bottom to top. Further, the above-mentioned movement directions may be combined. Thus, even when the first openings 31 are formed in a more complicated shape, it is possible to form the first openings 31 for a short period of time since the irradiation position movement direction of the laser beam 70 can be freely set.

(3) Step of Forming Identification Mark

The identification mark 30 is formed by performing a step of a plurality of first openings 31. As shown in FIG. 7, a first sub-opening 31a is formed, the output power of the laser beam 70 is turned off, the irradiation position of the laser beam 70 is moved to a planned region where another sub-opening 31b is to be formed, and the output power of the laser beam 70 is turned on in the step of forming the plurality of first openings. And then, the step of forming the second openings in item (1) and the step of forming a first opening in item (2) are repeated to form the plurality of first openings 31, resulting in the formation of the identification mark 30.

The process for forming an identification mark on a glass plate according to the present invention allows the identification mark 30 to be formed in a more complicated fashion since the identification mark 30 is made of the plurality of first openings 31. This arrangement allows the identification mark 30 to be utilized as a two-dimensional code to hold production information including a large volume of data since it is possible to form the identification mark 30 in such a more complicated fashion. Further, although the second openings 40 and the first openings 31 are formed by grinding only the light-sealing layer 21, the glass plate 10 is prevented from being damaged since only the light-sealing layer 21 is ground. Thus, the process for forming an identification mark on a glass plate according to the present invention allows a glass plate with an identification mark 100 to be formed which ensures correct reading for a long period of time without a decrease in the strength of the glass plate.

The step of forming the second openings, the step of forming the first openings and the step of forming the identification mark are preferred to be performed in a darkroom or the like. When the step of forming the second openings, the step of forming the first openings and the step of forming the identification mark are performed in a darkroom, the laser beam 70 advantageously prevents from being affected by external light or the like. Alternatively, the stage may be surrounded by a blackout curtain or the like to prevent the laser beam 70 from leaking out for shielding, in place of using a darkroom.

Figure 9:
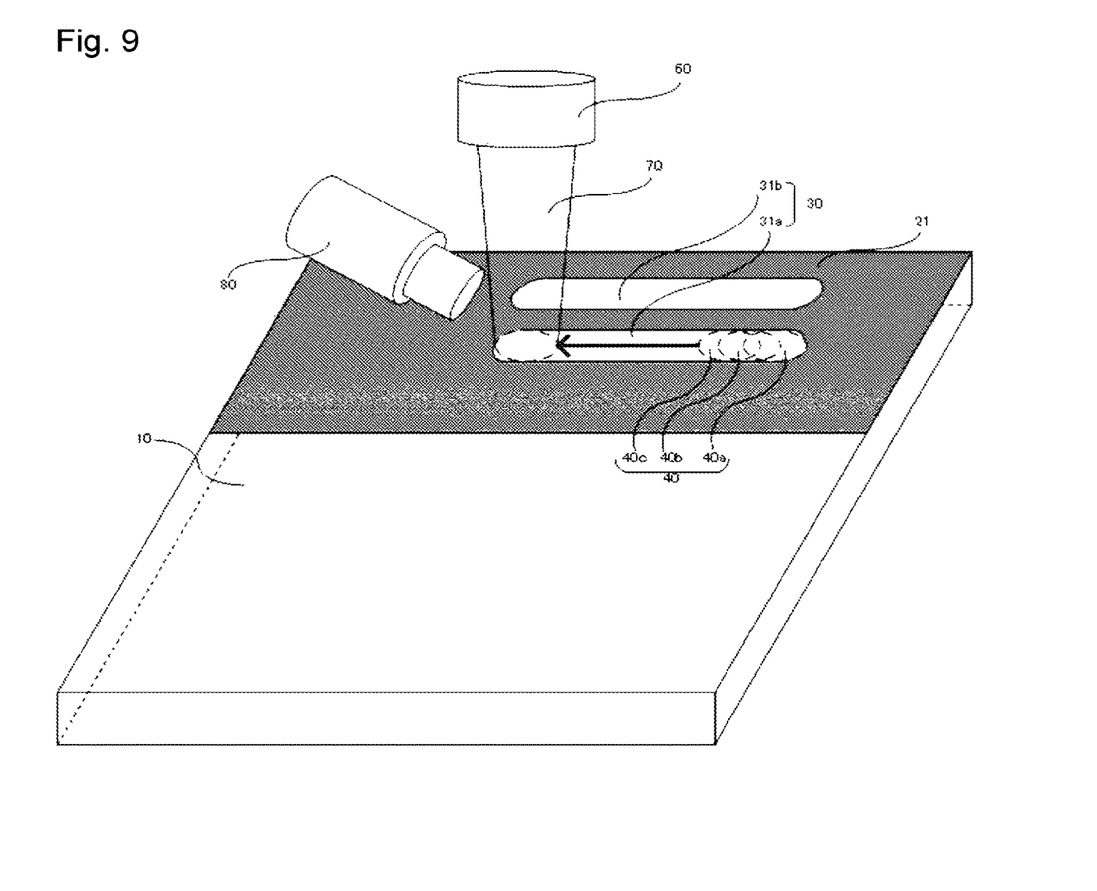
FIG. 9 is a schematic perspective view illustrating the process for forming an identification mark on a glass plate according to another embodiment of the present invention.

FIG. 9 is a schematic perspective view illustrating the process for forming an identification mark on a glass plate according to another embodiment of the present invention. As shown in FIG. 9, in the process for forming an identification mark on a glass plate according to this embodiment, at least one selected from ventilating treatment, exhausting treatment, sucking treatment, blowing treatment and dust-collecting treatment may be performed, simultaneously with the application of a laser beam 70, in the vicinity of a region where the laser beam is applied to a light-shielding layer 21. The other members, elements and parts are common to the ones of the process for forming an identification mark on a glass plate according to the previous embodiments. For this reason, the other members, elements and parts are designated by the identical reference symbols, and explanation of these will be omitted.

When the grinding operation is performed by applying the laser beam 70 to the light-shielding layer 21 to form openings in the light-shielding layer such that the openings are formed so as to reach the surface of a glass plate 10, the grinding operation produces ground debris of the light-shielding layer 21, smoke or the like. The produced ground debris or smoke could cause the laser beam 70 to be out of focus for example, resulting in failure of sufficient grinding of the light-shielding layer by the laser beam 70. From this point of view, a treatment machine 80 is preferred to be disposed, as shown in FIG. 9, in the vicinity of the region where the laser beam 70 is applied to the light-shielding layer 21, such that at least one selected from ventilating treatment, exhausting treatment, sucking treatment, blowing treatment and dust-collecting treatment is performed, simultaneously with the application of a laser beam 70, to deal with the smoke or the like that is produced when the laser beam 70 grinds the light-shielding layer 21. When the treatment machine 80 is preferred to be disposed in the vicinity of the region where the laser beam is applied to the light-shielding layer 21, and when at least one selected from ventilating treatment, exhausting treatment, sucking treatment, blowing treatment and dust-collecting treatment is performed to deal with the smoke or the like that is produced at the time of grinding the light-shielding layer 21 by the laser beam 70, the laser beam 70 is unlikely to be out of focus, resulting in formation of the identification mark 30 such that the identification mark can be optically read by a reader in an easy way.

INDUSTRIAL APPLICABILITY

The glass plate with an identification mark and the process for forming an identification mark according to the present invention are advantageously applicable to a glass plate for a vehicle, such as a windshield, a sliding window, a fixed window, or rear glass, and is also applicable to a glass plate for a solar battery, or a glass plate for construction, for example.

The entire disclosure of Japanese Patent Application No. 2018-033409 filed on Feb. 27, 2018 including specification, claims, drawings and summary is incorporated herein by reference in its entirety.

What is claimed is:

1. A laminated glass with an identification mark, comprising:
   a first glass plate, a first light-shielding layer disposed on the first glass plate along a peripheral edge area of a principal surface of the first glass plate, and an identification mark formed in a region where the first light-shielding layer is disposed,
   wherein the identification mark comprises a plurality of first openings, and each of the first openings further comprises a plurality of second openings, each of which has a smaller area than each of the first openings,
   wherein each of the second openings is formed in a substantially circular shape having a radius of at least 0.05 mm and at most 0.3 mm,
   wherein a second glass plate is disposed, via an interlayer, on a principal surface of the first glass plate opposed to the principal surface of the first glass plate where the first light-shielding layer is disposed,
   wherein when the second glass plate has a second light-shielding layer disposed along a peripheral edge area of a principal surface thereof positioned on a car-interior side when the laminated glass is applied to an automobile opening, and
   wherein the second light-shielding layer of the second glass plate is positioned in a position to shield the identification mark when the second glass plate is bowled to the first glass plate via the interlayer.

2. The glass according to claim 1, wherein the second openings in the first light-shielding layer are formed so as to reach the first glass plate.

3. The glass according to claim 1, wherein the shortest distance between adjacent first openings is at most 0.2 mm.

4. The glass according to claim 1, wherein each of the first openings comprises at least two second openings which are partially overlapped each other.

5. The glass according to claim 1, wherein the identification mark comprises the first openings having different areas and/or different shapes.

6. The glass according to claim 1, wherein the identification mark is formed in the vicinity of an edge of the first glass plate.

7. The glass according to claim 1, wherein the first light-shielding layer has a thickness of at least 3 µm and at most 15 µm.

8. The glass according to claim 1, wherein the identification mark represents a one-dimensional code or two-dimensional code.

9. A glass plate with an identification mark, comprising:
   a glass plate, a first light-shielding layer disposed on the glass Plate along a peripheral edge area of a principal surface of the glass plate, and an identification mark formed in a region where the first light-shielding layer is disposed,
   wherein the identification mark comprises a plurality of first openings, and each of the first openings further comprises a plurality of second openings, each of which has a smaller area than each of the first openings,
   wherein each of the second openings is formed in a substantially circular shape having a radius of at least 0.05 mm and at most 0.3 mm,
   wherein the identification mark is shielded by a dark material, and
   wherein the dark material comprises an adhesive comprising a dark pigment.

10. The glass plate according to claim 9, wherein the second openings in the first light-shielding layer are formed so as to reach the glass plate.

11. The glass plate according to claim 9, wherein the shortest distance between adjacent first openings is at most 0.2 mm.

12. The glass plate according to claim 9, wherein each of the first openings comprises at least two second openings which are partially overlapped each other.

13. The glass plate according to claim 9, wherein the identification mark comprises the first openings having different areas and/or different shapes.

14. The glass plate according to claim 9, wherein the identification mark is formed in the vicinity of an edge of the glass plate.

15. The glass plate according to claim 9, wherein the first light-shielding layer has a thickness of at least 3 µm and at most 15 µm.

16. The glass plate according to claim 9, wherein the identification mark represents a one-dimensional code or two-dimensional code.

17. A process for forming an identification mark on a glass plate according to claim 9 comprising:
   preparing a glass plate with a light-shielding layer disposed on the glass plate along a peripheral edge area of at least one of the principal surfaces of the glass plate, and
   applying a laser beam to the light-shielding layer to put an identification mark: applying the laser beam toward the light-shielding layer of the glass plate from a laser beam source, the laser beam having an output power of at least 2 W and at most 25 W, and forming a plurality of second openings in a substantially circular shape having a radius of at least 0.05 mm and at most 0.3 mm such that the second openings in the light-shielding layer are formed so as to reach the surface of the glass plate;
   forming each of a plurality of first openings by moving an irradiation position of the laser beam while forming the second openings; and
   forming the first openings to form the identification mark.

18. The process according to claim 17, wherein the forming of a first opening is performed such that the laser beam has an irradiation position movement speed of at least 200 mm/s and at most 3,000 mm/s.

19. The process according to claim 17, wherein the laser beam has a wavelength of 1.064 nm.

20. The process according to claim 17, wherein the forming of the second openings, the forming of a first opening, and the forming of the identification mark are performed in a darkroom.

21. The process according to claim 17, wherein at least one selected from ventilating treatment, exhausting treatment, sucking treatment, blowing treatment and dust-collecting treatment is performed, simultaneously with the application of the laser beam, in the vicinity of a region Where the laser beam is applied to the light-shielding layer.

\* \* \* \* \*